Oct. 27, 1959 R. L. CARLSTEDT 2,909,946
DEEP HOLE BORING MACHINE
Filed June 25, 1957 2 Sheets-Sheet 1
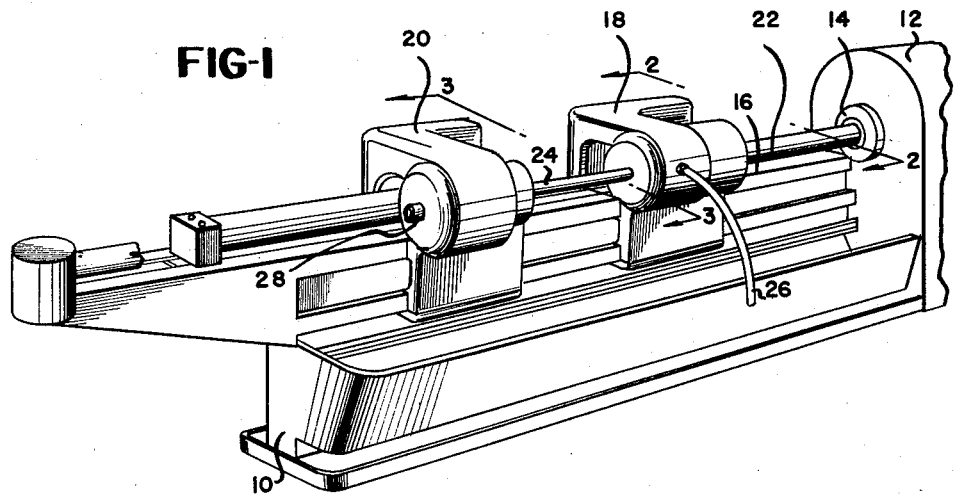
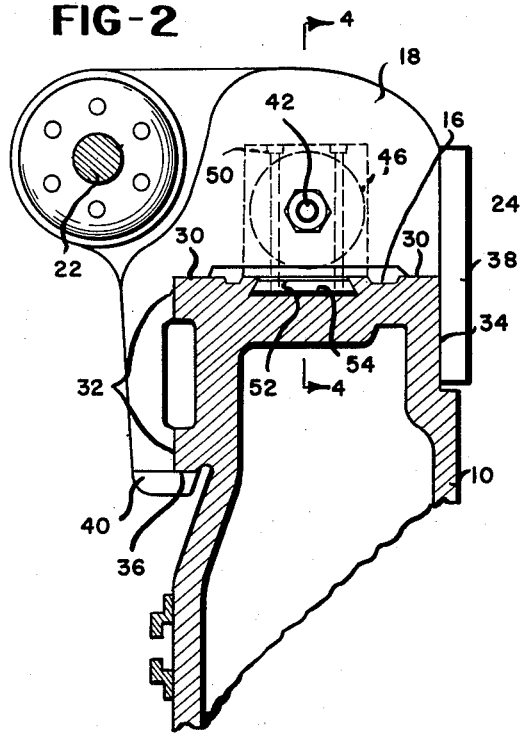
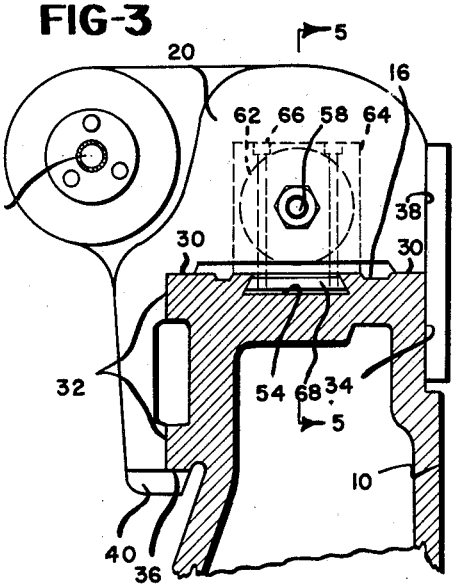
INVENTOR
RAGNAR L. CARLSTEDT
BY *Toulmin & Toulmin*
ATTORNEYS Oct. 27, 1959 R. L. CARLSTEDT 2,909,946
DEEP HOLE BORING MACHINE
Filed June 25, 1957 2 Sheets-Sheet 2
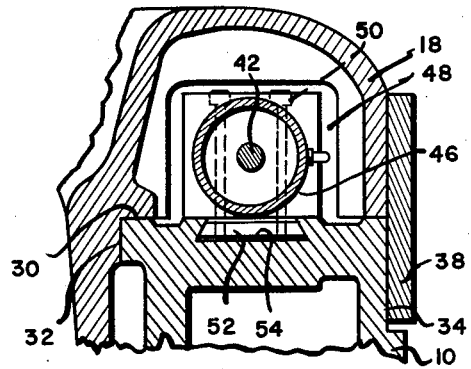
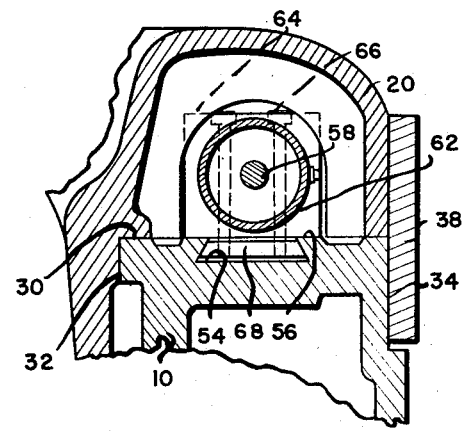
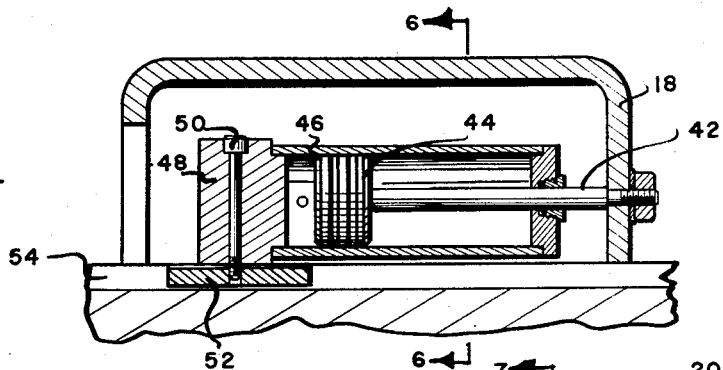
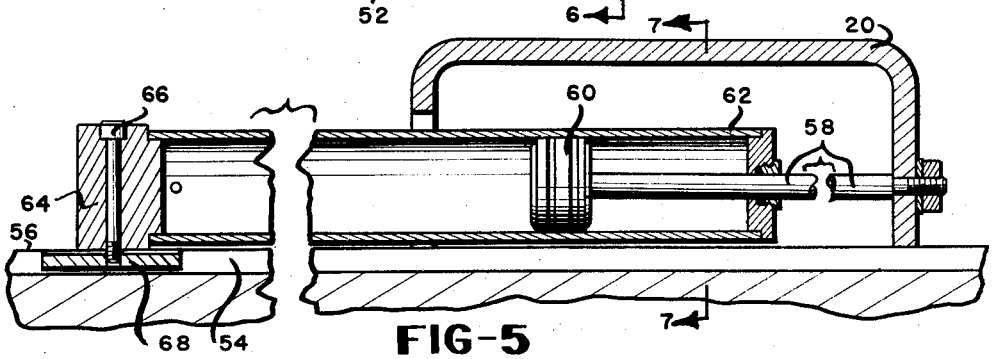
INVENTOR
RAGNAR L. CARLSTEDT
BY Toulmin & Toulmin
ATTORNEYS

United States Patent Office 2,909,946
Patented Oct. 27, 1959

2,909,946

DEEP HOLE BORING MACHINE

Ragnar L. Carlstedt, Cincinnati, Ohio, assignor to DHB Corp., New York, N.Y.

Application June 25, 1957, Serial No. 667,823

4 Claims. (Cl. 77—3)

This invention relates to deep hole boring machines and is particularly concerned with a deep hole boring machine.

In connection with deep hole boring machines such as machines for drilling gun barrels and making hollow shafts and the like, high speed of operation is important and for this reason the parts of the machine must be firmly connected together to avoid vibration. Also, such machines in order to have a high degree of utility must be adjustable with regard to the length of workpiece that can be handled. Still further, many of the workpieces that are handled are large and heavy, and it is a convenience for the workpiece axis to be located to one side of the main frame of the machine.

With the foregoing in mind a primary object of the present invention is the provision of a boring machine, particularly adapted for boring deep holes at a high rate of speed which is readily adjustable to a wide range of workpieces and which is extremely rapid in operation and which is free of vibration of the individual components of the machine.

An object of this invention is the provision of an arrangement for adjusting the clamp and boring slides to such positions that a minimum amount of movement thereof is necessary to accomplish the work operation to be carried out.

A still further object of this invention is the provision of a guiding means for supporting the clamping slide and boring bar of a deep hole boring machine such that the workpiece axis is offset from the frame of the machine but wherein the said slides are firmly supported so that they will not vibrate as the machine operates.

These and other objects and advantages will become more apparent upon reference to the drawings in which:

Figure 1 is a perspective view of a boring machine constructed according to this invention;

Figure 2 is a transverse section through the machine indicated by line 2—2 on Figure 1 looking in at the end of the clamping slide that engages the workpiece;

Figure 3 is a sectional view indicated by line 3—3 on Figure 1 looking in at the end of the boring slide from which the boring bar extends;

Figure 4 is a sectional view indicated by line 4—4 on Figure 2 showing the motor for the clamping slide and the manner in which the motor is adjustably connected to the frame of the machine;

Figure 5 is a sectional view indicated by line 5—5 on Figure 3 showing the motor for the boring slide and the manner in which it is adjustably connected with the main frame of the machine;

Figure 6 is a sectional view indicated by line 6—6 on Figure 4 showing in cross-section the clamping slide; and Figure 7 is a sectional view indicated by line 7—7 on Figure 5 showing in cross-section the boring slide.

Referring to the drawings somewhat more in detail, the boring machine comprises a frame 10 having a spindle housing 12 at one end thereof that rotatably mounts a spindle 14 adapted for being driven in a rotation by a drive motor not shown.

Frame 10 comprises a bed 16 on which is slidably mounted a clamping slide 18 and a boring slide 20. Clamping slide 18 is adapted for engaging the end of workpiece 22 opposite spindle 14 and for holding it in driving engagement with the said spindle by the clamping thrust developed by the clamping slide. Boring slide 20 supports a hollow boring bar 24 that extends sealingly through the end of clamping slide 18 opposite the workpiece and engages the end of the workpiece so that as the workpiece rotates the boring bar will form a bore therein. A supply of coolant and lubricant under high pressure is delivered via conduit 26 to the clamping slide and therethrough to the bore being formed in the workpiece and the lubricant then flushes the chips taken by the boring bar backwardly therethrough and out the tubing 28 to a filtering unit.

As will be seen in Figures 2 and 3 the bed 16 of frame 10 consists of horizontal machined ways 30 extending along the top of the frame, vertical machined ways 32 extending above the front of the machine, the vertical machined way 34 extending along the back of the frame, and a machined way 36 facing downwardly and extending along the front side of the frame below the lowermost surface 32.

Each of slides 18 and 20 is provided with machined surfaces engaging surfaces 30 and 32 and each slide is also provided with a bolted on gib 38 to engage surface 34 and another bolted on gib 40 to engage surface 36.

By the arrangement described the slides are accurately guided along the frame of the machine but engage the machine in such a manner as to prevent vibration of the slides during a work operation. This is the case even though the work axis of the machine is offset laterally from the frame as will plainly be seen in Figures 2 and 3.

Clamping slide 18 has connected therewith at a forward part thereof a ram 42 that has connected therewith a piston 44 mounted in clamp cylinder 46. Clamp cylinder 46 at its end opposite piston rod 42 comprises a block 48 of substantial size through which there extends the clamp screws 50 into a tapered plate 52 slidably arranged in dove-tail groove 54 that extends down the center of the bed portion of frame 10. It will be evident that the entire clamping slide can rotatably be adjusted longitudinally of the bed and fixedly locked in place by tightening the clamp screws 50. The block 48 is so arranged that it takes a bearing on the surfaces 56 machined on the upper face of the bed on the opposite sides of the dovetail groove 54 so that the locking of the clamp motor to the bed will not in any way influence the support for the clamping slide.

Similarly to the clamping slide, boring slide 20 has connected to a forward part thereof a piston rod 58 that has connected therewith a piston 60 in a cylinder 62 that also has a block 64 of substantial size at its end opposite piston rod 58. This block has clamp screws 66 extending therethrough that engage tapered plate 68 also locked in dove-tail groove 54. Block 64, similarly to block 48 is supported on and is slidable along surfaces 56 so that the boring slide motor can be adjusted to any desired position along the bed and fixed in place and the fixing in place of the boring slide motor will not in any way detract from the guiding support of the boring slide itself. The described arrangement provides for complete adjustability and flexibility of the boring machine within the limits of the length of the bed formed on the machine frame so that workpieces of any size coming within these limits can readily be handled and at all times the clamping slide and boring slide will be firmly and accurately supported and guided on the bed of the machine.

The loading of the workpiece into the machine and the removing of the workpiece therefrom is facilitated by the offset position of the workpiece axis. This offsetting of the axis however does not detract from the rigidity of the machine or the solid support of the clamping and boring slides because of the distribution and arrangement of the way surfaces of the bed and the surfaces of the boring slides in engagement therewith and the gibs also engaging the way surfaces and bolted to the said slides.

It will be understood that this invention is susceptible to modification in order to adapt it to different usages and conditions; and, accordingly, it is desired to comprehend such modifications within this invention as may fall within the scope of the appended claims.

I claim:

1. In a boring machine; a machine frame, a rotatable spindle at one end of the frame, ways machined on the machine frame and extending parallel with the axis of rotation of the spindle, a dove-tail groove formed in the top of said frame and extending parallel with said ways, clamping and boring slides mounted on said ways, and motor means for reciprocating at least one of said slides and comprising a rod connected with the slide and a cylinder having its end opposite the rod resting on the frame over the dove-tail groove, and a plate setting in said dove-tail groove and adapted for being clamped to the said end of the cylinder whereby the cylinder can be adjustably connected with said machine frame.

2. An arrangement according to claim 1 in which the said rod is connected with the slide at the end of the slide nearest the spindle.

3. In a boring machine, a machine frame, a rotatable spindle at one end of the frame, ways machined on the machine frame and extending parallel with the axis of rotation of the spindle, said ways including a pair of spaced ways on an upper part of said frame, a dove-tail groove machined in the top of the frame between said pair of ways, clamping and boring slides mounted on the machine frame and slidably engaging all of said ways except the said pair of ways, and motor means for reciprocating said slides and at least the motor means for the boring slide comprising a rod connected with the slide and a cylinder into which the rod extends and including a block on the end thereof opposite the rod resting on said pair of ways, a tapering plate in said dove-tail groove, and screws extending through said block and into said plate whereby the block can be clamped to the machine frame in any adjusted position along said pair of ways.

4. In a boring machine for boring deep holes in elongated workpieces; a machine frame, a spindle housing on the frame at one end and a rotatable spindle therein located to one side of the main portion of the frame, machined ways extending along the said main portion of the frame parallel with the axis of rotation of said spindle forming a bed on the frame, a groove in the frame parallel with said ways, clamping and boring slides mounted on said ways and defining with said spindle a work axis and also parallel with said ways, motors for reciprocating said slides on said ways, and at least the motor for said boring slide comprising a ram connected with the forward part of the boring slide, a cylinder into which the ram extends and there being a member connected with the end of the cylinder opposite the end from which the ram extends extending into said groove, and means for clamping said member in said groove in any selected position therealong whereby the member and cylinder can be fixed to the frame in adjusted position therealong.

References Cited in the file of this patent

UNITED STATES PATENTS

| | | |
|---|---|---|
| 2,152,293 | Wagner | Mar. 28, 1939 |
| 2,268,214 | Irtenkauf | Dec. 30, 1941 |
| 2,601,345 | Turchan | June 24, 1952 |
| 2,603,117 | Turchan et al. | July 15, 1952 |